United States Patent
Frazier et al.

(10) Patent No.: US 7,958,139 B2
(45) Date of Patent: Jun. 7, 2011

(54) RELATED CONTENT STORAGE AND RETRIEVAL SYSTEMS AND METHODS

(75) Inventors: Kristopher T. Frazier, Frisco, TX (US); Brian F. Roberts, Dallas, TX (US); Donald H. Relyea, Dallas, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 411 days.

(21) Appl. No.: 12/059,585

(22) Filed: Mar. 31, 2008

(65) Prior Publication Data
US 2009/0248731 A1 Oct. 1, 2009

(51) Int. Cl.
  G06F 17/30 (2006.01)
  G06F 7/00 (2006.01)
(52) U.S. Cl. ......................... 707/769; 707/722
(58) Field of Classification Search .................. 707/805, 707/769, 722
See application file for complete search history.

(56) References Cited

U.S. PATENT DOCUMENTS

| | | | |
|---|---|---|---|
| 7,672,909 B2 * | 3/2010 | Meijer et al. | 706/12 |
| 7,716,150 B2 * | 5/2010 | Cheng et al. | 706/45 |
| 2008/0140679 A1 * | 6/2008 | Deyo et al. | 707/100 |

* cited by examiner

Primary Examiner — Kuen S Lu

(57) ABSTRACT

In an exemplary method, content instances and metadata associated with the content instances are maintained, a request for content is received, one of the content instances is identified based on the request, at least one other of the content instances is identified as being related to the one content instance based on a predefined relationship heuristic and the metadata associated with the content instances, and data representative of the one content instance and the other content instance is provided in response to the request. In certain embodiments, the related content instance is identified by identifying a metadata value associated with the one content instance and a common metadata value associated with the other content instance. In certain embodiments, the common metadata value includes at least one of a common location data value, a common time data value, a common user identifier, and a common content type.

22 Claims, 16 Drawing Sheets

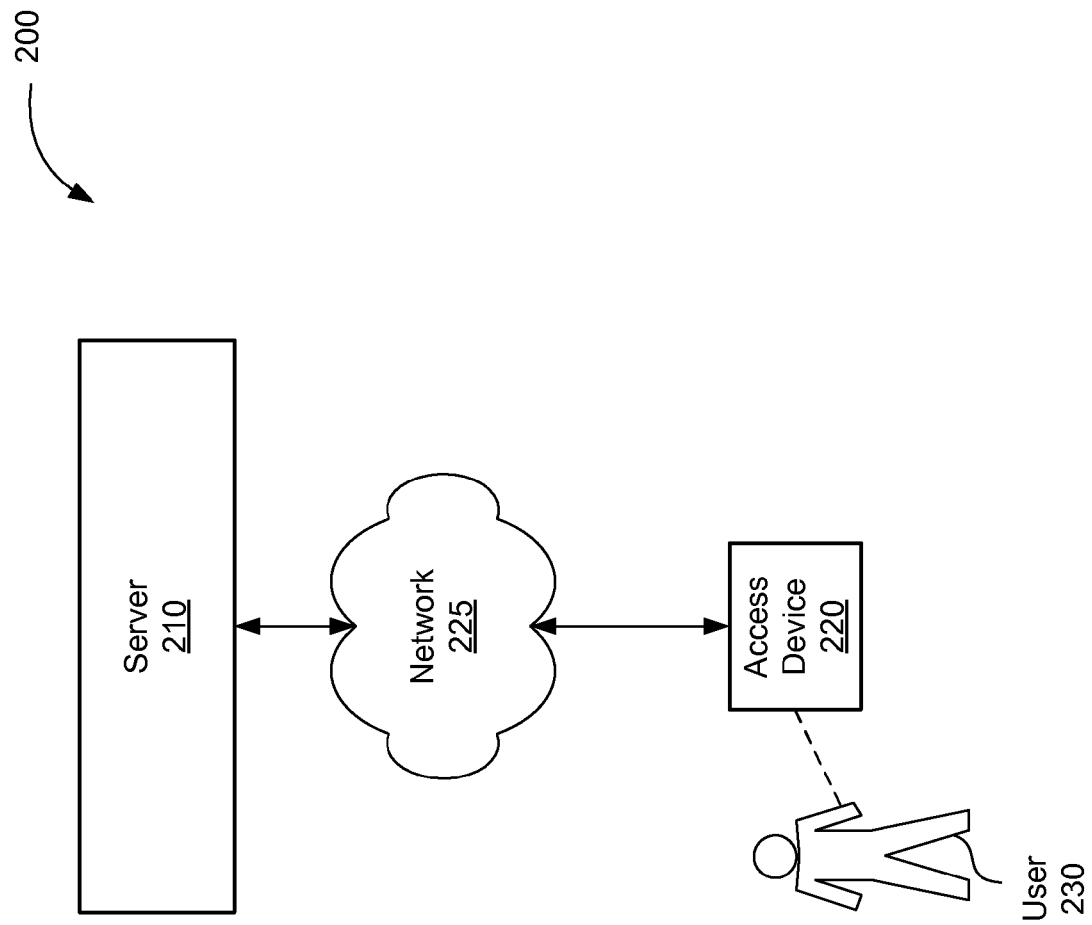

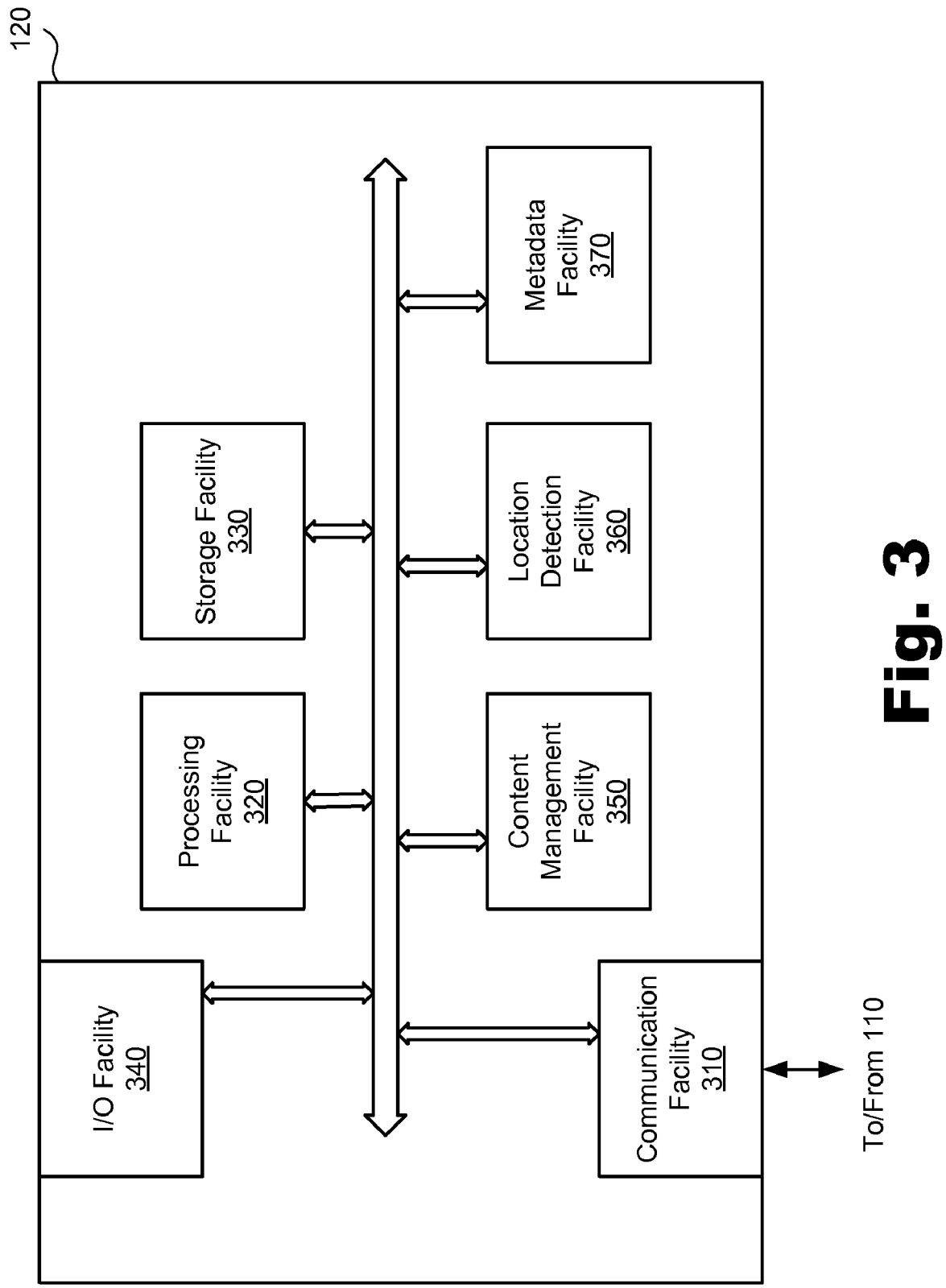

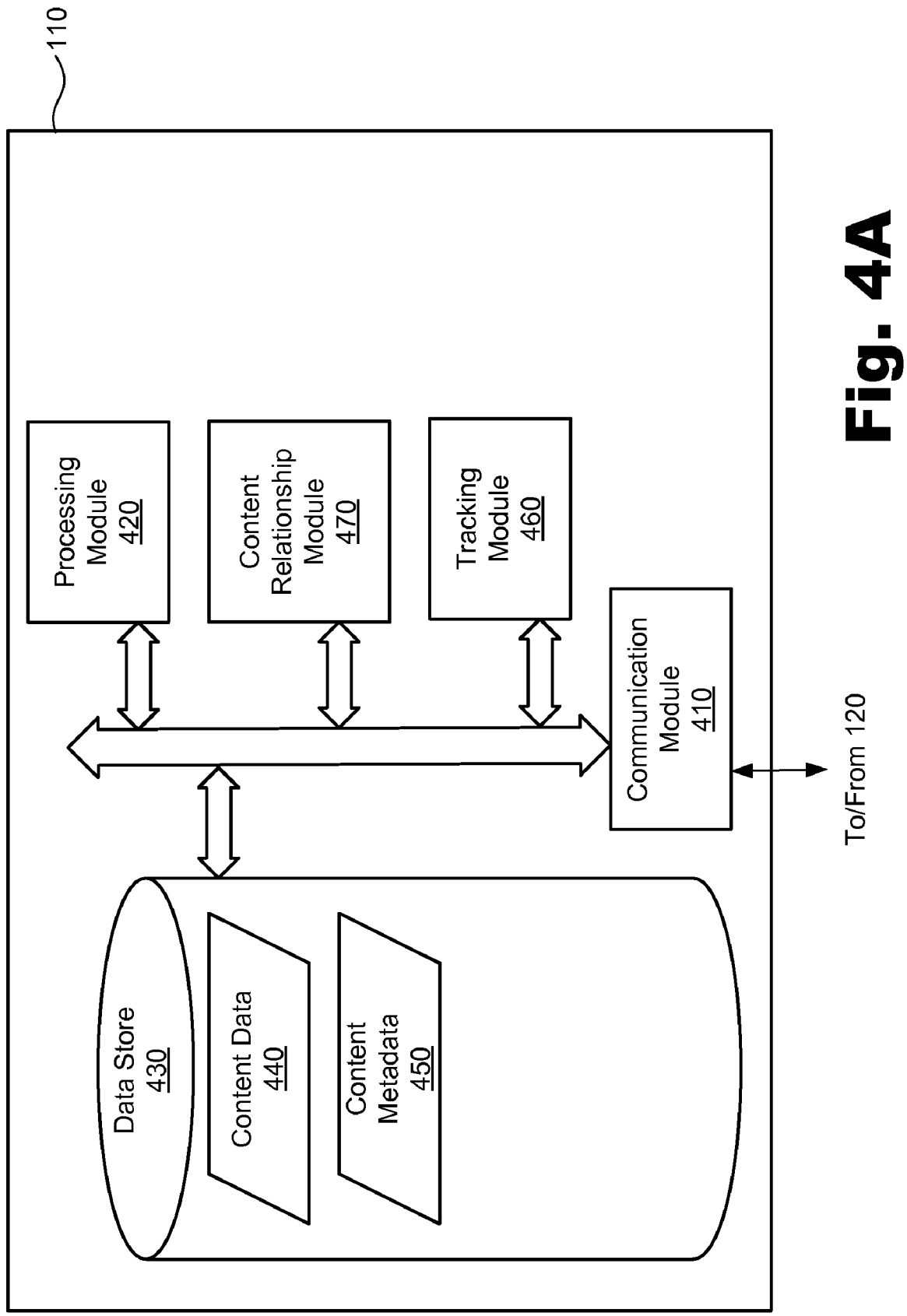

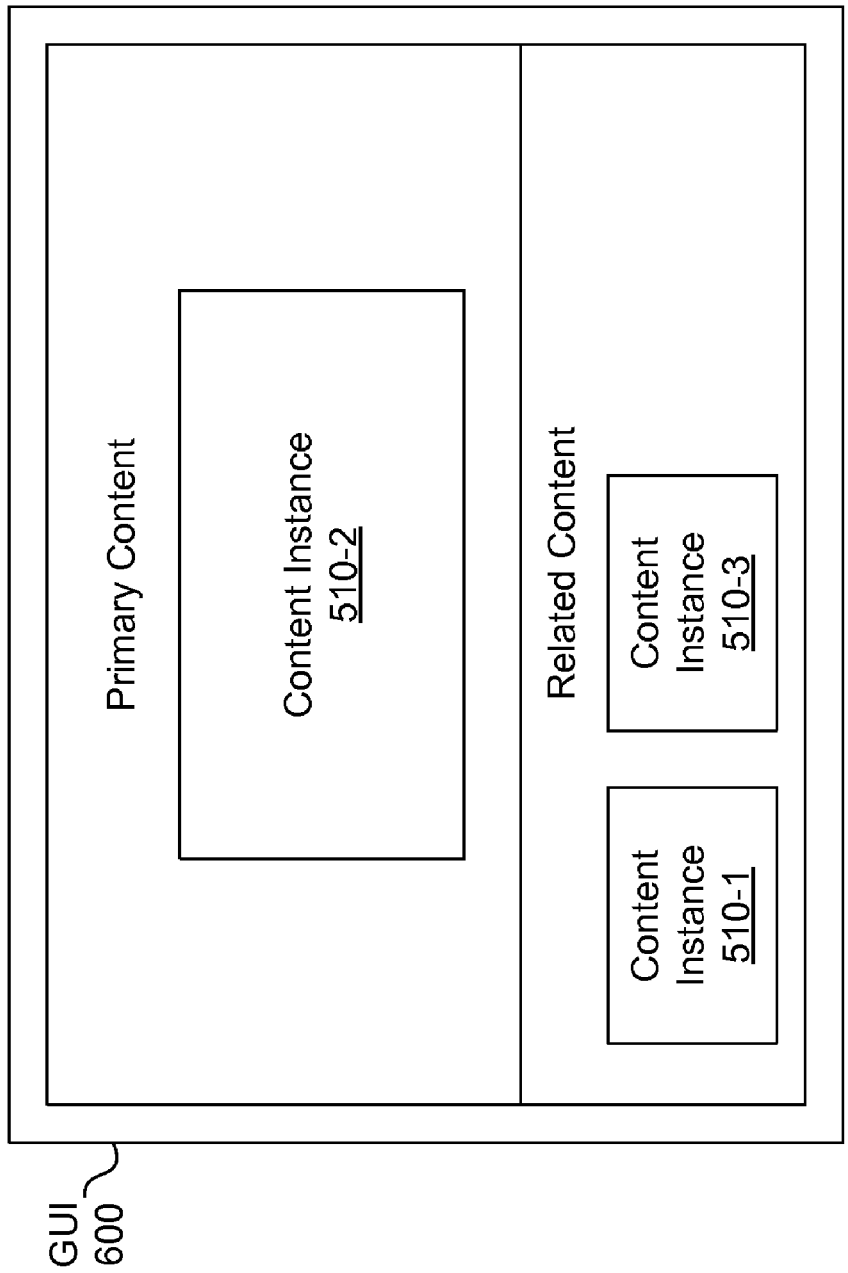

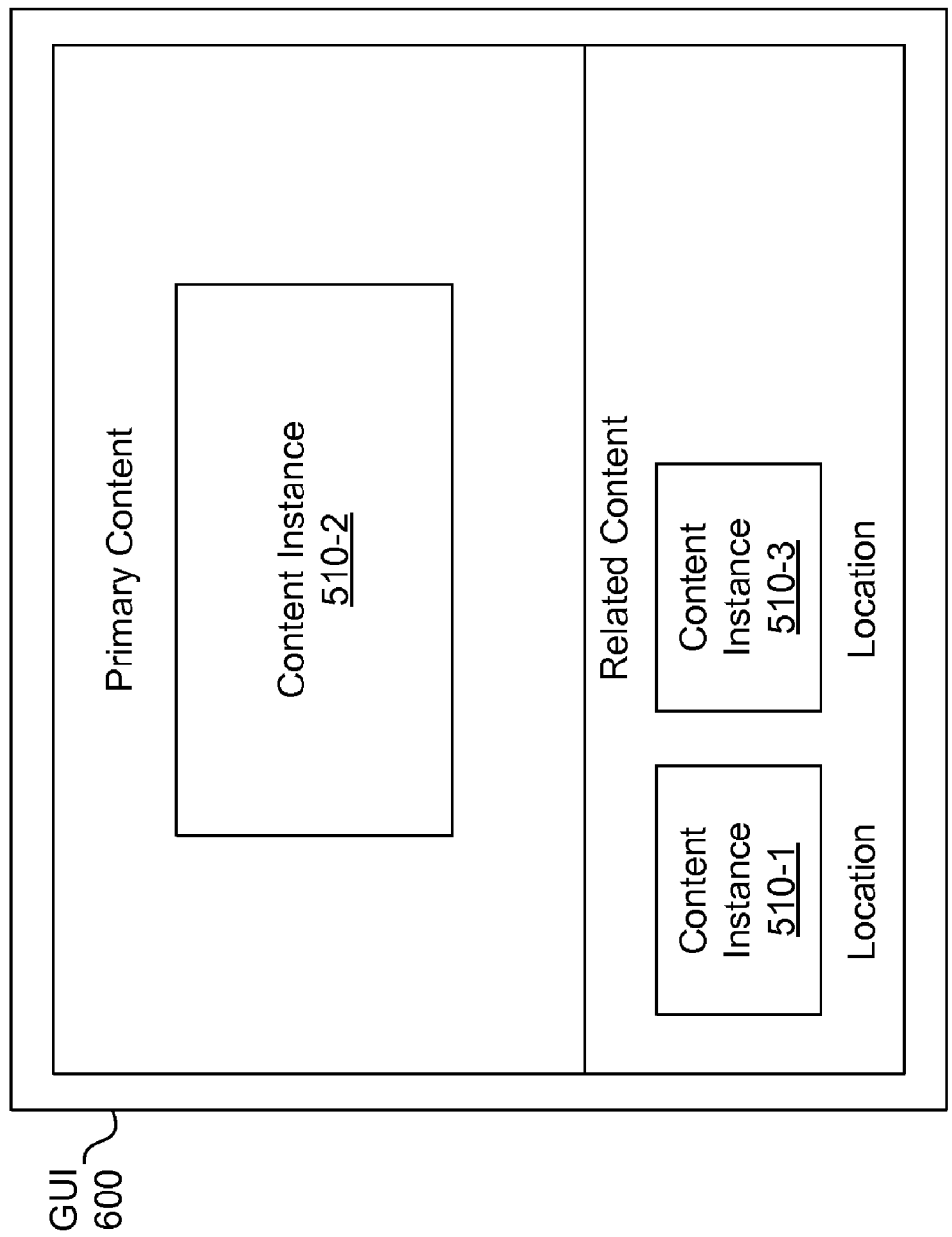

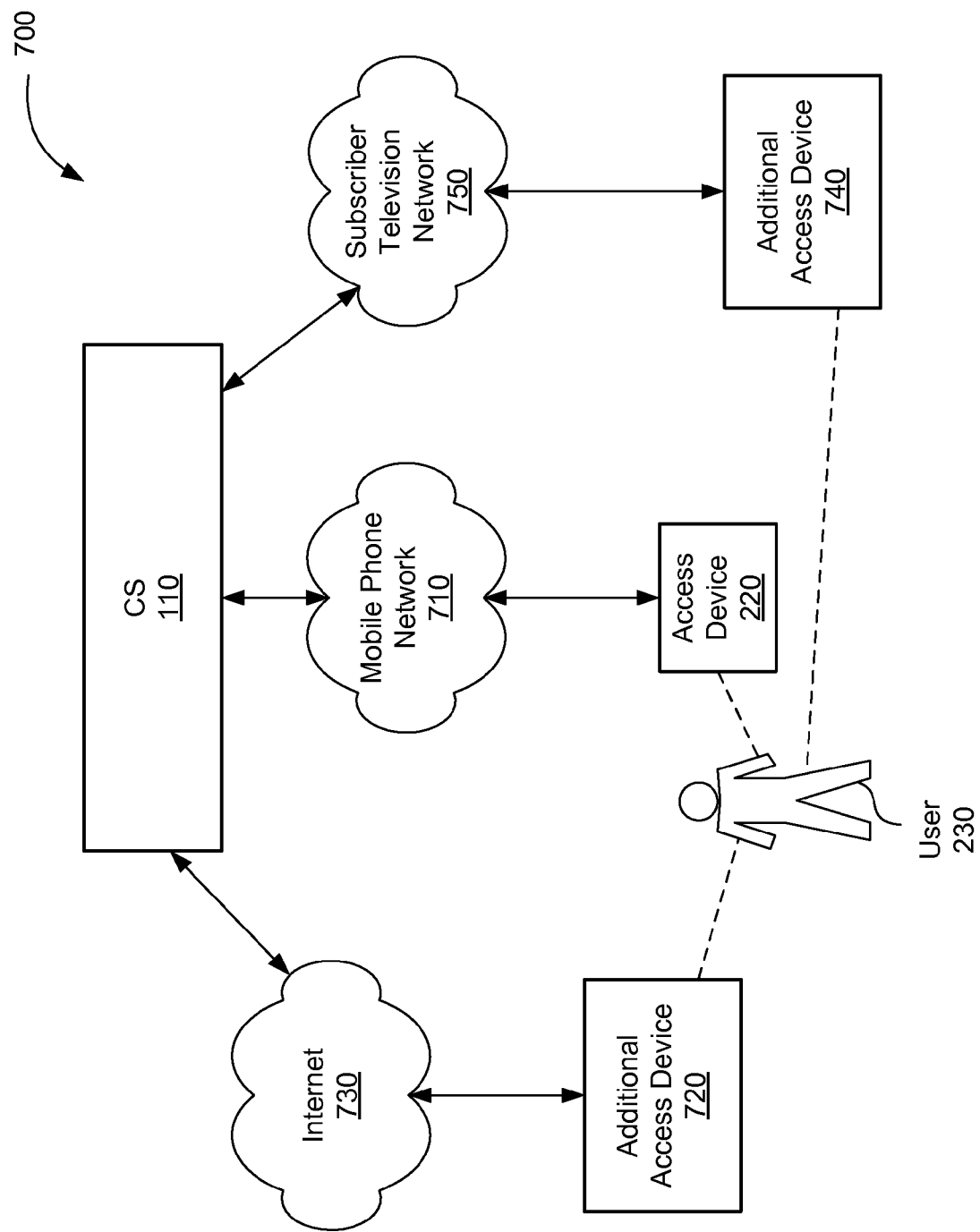

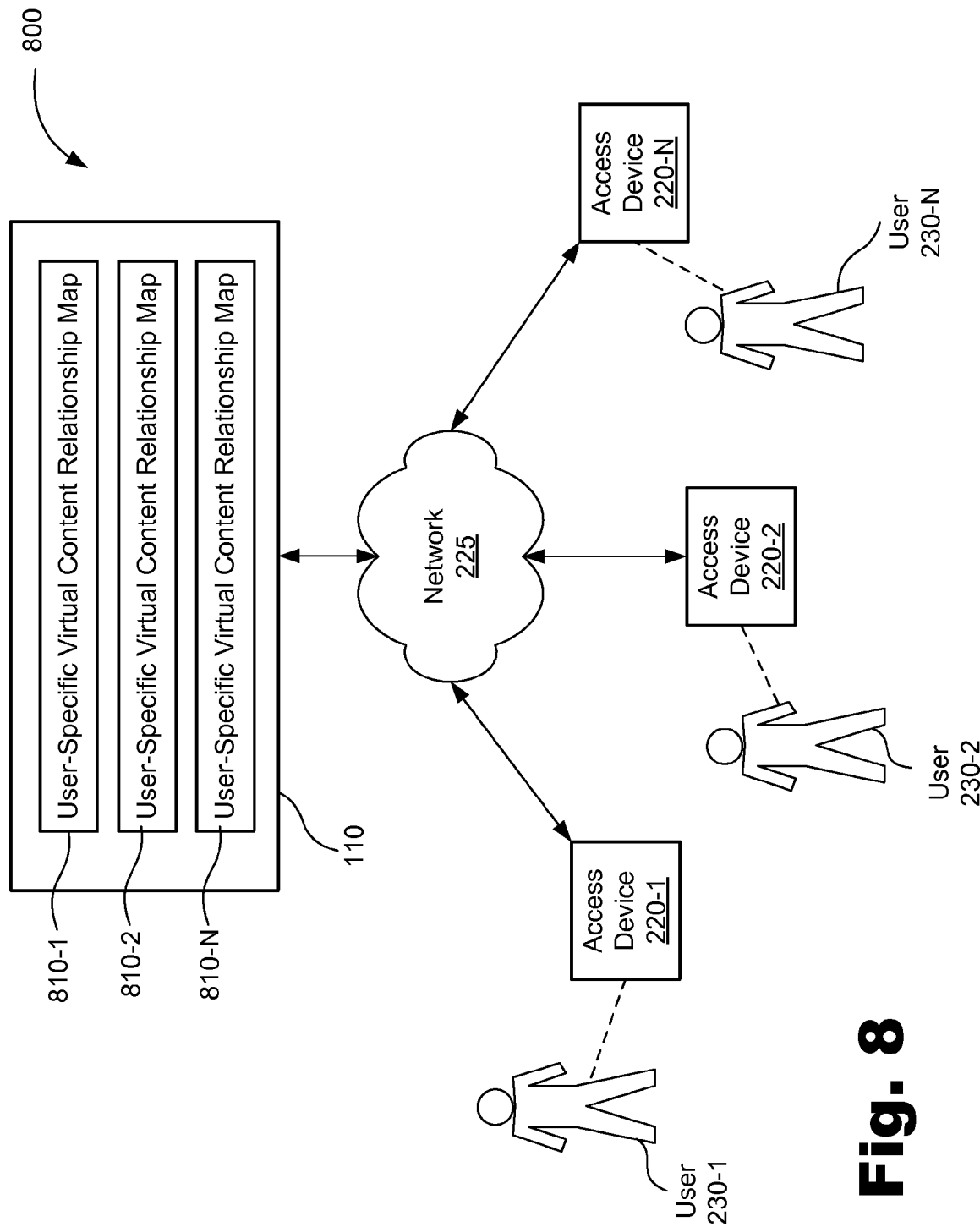

RELATED CONTENT STORAGE AND RETRIEVAL SYSTEMS AND METHODS

BACKGROUND INFORMATION

In computing, a file system is typically configured to translate physical locations on a disk (e.g., a hard drive) to a logical data structure in which electronic files are organized in hierarchical directories. It is not uncommon for such directories to include many hierarchical levels and vast numbers of files. Unless specific information about a particular file or its hierarchical location is known, it can be difficult to locate the electronic file within a conventional hierarchical directory. Difficulties in locating electronic files typically intensify along with an increase in the number of electronic files in a hierarchical directory.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

FIG. 2 illustrates an exemplary implementation of the system of FIG. 1.

FIG. 3 illustrates exemplary components of an access subsystem.

FIG. 4A illustrates exemplary components of a content storage and retrieval subsystem.

FIGS. 6A-C illustrate several exemplary views of content displayed in a graphical user interface.

FIG. 7 illustrates another exemplary implementation of the system of FIG. 1.

FIG. 8 illustrates another exemplary implementation of the system of FIG. 1.

DETAILED DESCRIPTION OF PREFERRED EMBODIMENTS

Figure 1:
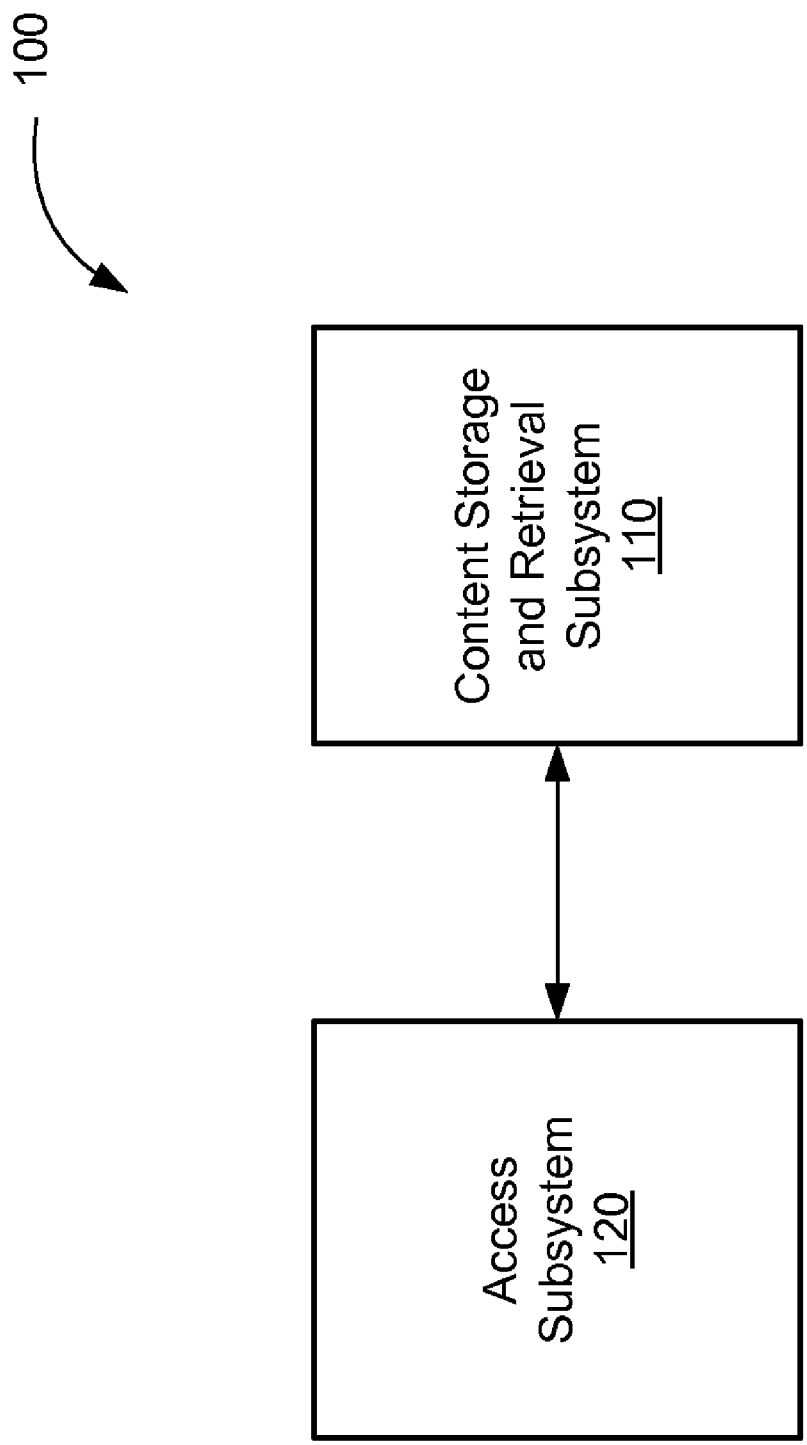
FIG. 1 illustrates an exemplary relative content storage and retrieval system.

Exemplary relative content storage and retrieval systems and methods are described herein. The exemplary systems and methods may be configured to store and/or retrieve content based on a predefined relationship heuristic and metadata associated with the content. The relationship heuristic may define one or more content relationships, and the metadata associated with the content may be used to identify the existence of content relationships within the content, e.g., between content instances included in the content. The content and identified relationships within the content may form one or more virtual content relationship maps, which may be used to identify and retrieve related content. For example, a content instance may be identified and retrieved, and one or more other content instances may be determined to be related to the content instance and also retrieved. Accordingly, a user may be able to leverage one content instance in order to locate and retrieve a related content instance.

As used herein, the term "content instance" refers generally to any data record or object (e.g., an electronic file) storing or otherwise associated with content, which may include electronic data representative of text, one or more messages (e.g., short message service ("SMS") messages, electronic mail messages, or multimedia message service ("MMS") messages), one or more symbols, one or more graphics, one or more images (e.g., digital photographs and video frames), video, audio, multimedia, video games, or any segment, component, or combination of these or other forms of electronic data that may be viewed or otherwise experienced by a user.

The term "metadata" as used herein refers generally to any electronic data descriptive of content and/or content instances. For example, metadata may include, but is not limited to, content instance identifiers (e.g., file names), time data, location data, user data, source data, destination data, size data, creation data, modification data, data structure data, and access data descriptive of content and/or one or more content instances. Examples of metadata may include time data associated with a data operation (e.g., creating, modifying, deleting, receiving, or sending content), location data associated with a data operation (e.g., a geographic or network location at which content is created), user data identifying one or more users associated with content (e.g., a user who created, modified, deleted, sent, received, accessed, or otherwise operated on or is owner of content), content type information (e.g., file type or other predefined category of content), content transport information, source data associated with a source of content (e.g., a user from whom content is received), and destination data associated with a destination to which content is sent (e.g., a user to whom content is transmitted).

In certain exemplary embodiments, a plurality of content instances and metadata associated with the content instances are maintained. A request for content is received, and one of the content instances is identified based on the request. At least one other of the content instances is identified as being related to the one content instance based on a predefined relationship heuristic and the metadata associated with the content instances. Data representative of the one content instance and the related other content instance is provided in response to the request. In certain embodiments, the related content instance is identified by identifying a metadata value associated with the one content instance and a common metadata value associated with the related content instance. In certain embodiments, the common metadata value includes at least one of a common location data value, a common time data value, a common user identifier, and a common content type. In certain embodiments, a graphical user interface is displayed and includes the data representative of the one content instance and the related other content instance.

In certain embodiments, content instances and at least one relationship between the content instances form a virtual content relationship map. The virtual content relationship map may be used to identify related content instances. In some examples, the virtual content relationship map may be specific to a single user. For example, the virtual content relationship map may include only content instances associated with the user (e.g., created or owned by the user) and relationships between these content instances. In certain examples, multiple virtual content relationship maps may be formed, with each virtual content relationship map being specific to a different user.

In certain embodiments, the virtual content relationship map may enable a user to traverse one or more relationships in the map to move the focus of processing) to different content instances in the map. For example, processing may be focused on one content instance, and when a user selects a related content instance, the relationship between the two content instances may be traversed and processing moved from the one content instance to the related content instance. In this or similar manner, a path within the virtual content relationship map may be defined and one or more content instances and relationships traversed by the path to locate a particular content instance. Hence, a user may leverage relationships between content instances to locate particular content.

Exemplary embodiments of relative content storage and retrieval systems and methods will now be described in more detail with reference to the accompanying drawings.

FIG. 1 illustrates an exemplary content storage and retrieval system 100 (or simply "system 100"). As shown in FIG. 1, system 100 may include a content storage and retrieval subsystem 110 and an access subsystem 120 configured to communicate with one another. Access subsystem 120 and content storage and retrieval subsystem 110 may communicate using any communication platforms and technologies suitable for transporting data representative of content, content metadata, content management commands, and/or other communications, including known communication technologies, devices, media, and protocols supportive of remote or local data communications. Example of such communication technologies, devices, media, and protocols include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), Evolution Data Optimized Protocol ("EVDO"), radio frequency ("RF") signaling technologies, signaling system seven ("SS7") technologies, Ethernet, in-band and out-of-band signaling technologies, and other suitable communications networks and technologies.

In some examples, system 100 may include any computer hardware and/or instructions (e.g., software programs), or combinations of software and hardware, configured to perform the processes described herein. In particular, it should be understood that components of system 100 may be implemented on one physical computing device or may be implemented on more than one physical computing device. Accordingly, system 100 may include any one of a number of well known computing devices, and may employ any of a number of well known computer operating systems, including, but by no means limited to, known versions and/or varieties of Microsoft Windows, UNIX, Macintosh, and Linux operating systems.

Accordingly, the processes described herein may be implemented at least in part as computer-executable instructions, i.e., instructions executable by one or more computing devices, tangibly embodied in a computer-readable medium. In general, a processor (e.g., a microprocessor) receives instructions, e.g., from a memory, a computer-readable medium, etc., and executes those instructions, thereby performing one or more processes, including one or more of the processes described herein. Such instructions may be stored and transmitted using a variety of known computer-readable media.

A computer-readable medium (also referred to as a processor-readable medium) includes any medium that participates in providing data (e.g., instructions) that may be read by a computer (e.g., by a processor of a computer). Such a medium may take many forms, including, but not limited to, non-volatile media, volatile media, and transmission media. Non-volatile media may include, for example, optical or magnetic disks and other persistent memory. Volatile media may include, for example, dynamic random access memory ("DRAM"), which typically constitutes a main memory. Transmission media may include, for example, coaxial cables, copper wire and fiber optics, including the wires that comprise a system bus coupled to a processor of a computer. Transmission media may include or convey acoustic waves, light waves, and electromagnetic emissions, such as those generated during radio frequency ("RF") and infrared ("IR") data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

FIG. 2 illustrates an exemplary implementation 200 of system 100. In implementation 200, content storage and retrieval subsystem 110 may include or be implemented within at least one server 210, and access subsystem 120 may include or be implemented within at least one access device 220 configured to communicate with server 210 by way of a network 225. Network 225 may include one or more networks, including, but not limited to, wireless networks, mobile telephone networks (e.g., cellular telephone networks), closed media networks, subscriber television networks, cable networks, satellite networks, the Internet, intranets, local area networks, public networks, private networks, optical fiber networks, broadband networks, narrowband networks, voice communications networks, Voice over Internet Protocol ("VoIP") networks, Public Switched Telephone Networks ("PSTN"), and any other networks capable of carrying data representative of content, content metadata, data management commands, and communications signals between access device 220 and server 210. Communications between the server 210 and the access device 220 may be transported using any one of above-listed networks, or any combination or sub-combination of the above-listed networks. In certain exemplary embodiments, network 225 includes a mobile telephone network and/or a subscriber television network.

Access device 220 may be associated with one or more users, which in certain embodiments may be subscribers to or users of one or more services (e.g., a wireless telephone service) provided over network 225. As an example, FIG. 2 shows user 230 as being associated with access device 220. The exemplary user 230 and the association of user 230 with access device 220 are shown for illustrative purposes. Other user associations with access device 220 may be defined in system 100.

Access device 220 may include any device configured to perform one or more of the content management processes described herein, including communicating with and/or transmitting and receiving content, content metadata, and content operation commands to/from content storage and retrieval subsystem 110 by way of network 225. Access device 120 may include, but is not limited to, a computing device (e.g., a desktop or laptop computer), a communication device, a wireless computing device, a wireless communication device (e.g., a mobile phone), a personal digital assistant, a content recording device (e.g., a camera, audio recorder, video camera), a vehicular computing and/or communication device, a content-enabled device, and any other device configured to perform one or more of the content management processes described herein. In certain exemplary embodiments, access device 220 includes a mobile telephone or a set-top box configured to access one or more services provided over network 225.

FIG. 3 illustrates components of an exemplary access subsystem 120. As shown in FIG. 3, access subsystem 120 may include a communication facility 310, processing facility 320, storage facility 330, input/output ("I/O") facility 340, content management facility 350, location detection facility 360, and metadata facility 370 communicatively connected to one another. The facilities 310-370 may be communicatively connected using any suitable technologies. Each of the facilities 310-370 may be implemented as hardware, computing instructions (e.g., software) tangibly embodied on a computer-readable medium, or a combination of hardware and computing instructions configured to perform one or more of the processes described herein. In certain embodiments, for example, metadata management facility 370 and/or one or more other facilities may be implemented as one or more software applications embodied on a computer-readable medium such as storage facility 330 and configured to direct processing facility 320 of the access subsystem 120 to execute one or more of the processes described herein.

Communication facility 310 may be configured to communicate with content storage and retrieval subsystem 110 (e.g., over network 225), including sending and receiving data representative of content, content metadata, content management commands, and other communications to/from content storage and retrieval subsystem 110. Communication facility 310 may include any device, logic, and/or other technologies suitable for transmitting and receiving data representative of content, content metadata, content management commands, and other communications. In certain embodiments, communication facility 310 may be configured to support other network service communications over network 225, including wireless voice, data, and messaging service communications, for example. Communication facility 310 may be configured to interface with any suitable communication media, protocols, formats, platforms, and networks, including any of those mentioned herein.

Processing facility 320 may be configured to execute and/or direct execution of operations of one or more components of the access device 220. Processing facility 320 may direct execution of operations in accordance with computer-executable instructions such as may be stored in storage facility 330 or another computer-readable medium. As an example, processing facility 320 may be configured to process content, including demodulating, decoding, and parsing received content, and encoding and modulating content for transmission to content storage and retrieval subsystem 110.

Storage facility 330 may include one or more data storage media, devices, or configurations and may employ any type, form, and combination of storage media. For example, the storage facility 330 may include, but is not limited to, a hard drive, network drive, flash drive, magnetic disc, optical disc, random access memory ("RAM"), dynamic RAM ("DRAM"), other non-volatile and/or volatile storage unit, or a combination or sub-combination thereof. Data, including data representative of content and/or content metadata (e.g., one or more content instances), may be temporarily and/or permanently stored in the storage facility 330.

I/O facility 340 may be configured to receive user input and provide user output and may include any hardware, firmware, software, or combination thereof supportive of input and output capabilities. For example, I/O facility 340 may include one or more devices for capturing or otherwise creating content, including, but not limited to, a still-shot camera, video camera, scanner, microphone, keyboard or keypad, touch screen component, and receiver (e.g., an RF or infrared receiver). Accordingly, a user 230 of access subsystem 120 may create content (e.g., by taking a picture or drafting a text message) and provide the content to content storage and retrieval subsystem 110, as described below.

I/O facility 340 may include one or more devices for presenting content for experiencing by the user 230, including, but not limited to, a graphics engine, a display, one or more display drivers, one or more audio speakers, and one or more audio drivers. Accordingly, I/O facility 340 may present content (e.g., play back and/or display) for experiencing by the user 230. I/O facility 340 may also be configured to provide other output for the user 230, including graphical user interfaces, indications of related content, and one or more tools for navigating related content, as described further below.

Content management facility 350 may be configured to provide one or more tools for management of content. The tools may include or be provided using hardware, computer-readable instructions embodied on a computer-readable medium such as storage facility 330 (e.g., one or more content management software applications), or a combination of hardware and computer-readable instructions. In certain embodiments, content management facility 350 may be implemented as a software application embodied on a computer-readable medium such as storage facility 330 and configured to direct the processing facility 320 of the access subsystem 120 to execute one or more of the content management operations described herein.

The tools may be configured to enable user 230 to create, modify, delete, annotate (e.g., edit, rate, label, add a note to, comment about, and categorize content), access, retrieve, copy, move, send, request, receive, and/or otherwise manage content. For example, a user 230 utilizing the content management tools may create and provide a content instance to content storage and retrieval subsystem 110. Through content management facility 350, the user 230 may access and manage (e.g., annotate, modify, copy, move, send, or delete) the content instance. Content management facility 350 may generate and provide content management commands to content storage and retrieval subsystem 110, which may be configured to receive and process the commands, and to identify and perform appropriate content management operations based on the commands. Content management commands may include instructions to store, modify, delete, annotate, access, retrieve, copy, move, and/or perform any other operations on content.

Metadata facility 370 may be configured to perform operations associated with content metadata, including generating, updating, and providing content metadata. Metadata facility 370 may include hardware, computer-readable instructions embodied on a computer-readable medium such as storage facility 330 (e.g., one or more content management software applications), or a combination of hardware and computer-readable instructions. In certain embodiments, metadata facility 370 may be implemented as a software application embodied on a computer-readable medium such as storage facility 330 and configured to direct the processing facility 320 of the access subsystem 120 to execute one or more of metadata operations described herein.

Metadata facility 370 may be configured to detect content management operations and to generate, update, and/or provide metadata associated with the operations. For example, when a content instance is created, metadata facility 370 may detect the creation of the content instance and identify and provide to data store 430 one or more metadata values associated with the content instance, such as time metadata indicating a time at which the content instance is created, user metadata indicating a user who created the metadata, content type metadata indicating a type (e.g., a file type or predefined content category) to be associated with the content instance, and location metadata indicating a location at which the content instance is created. As an example, if access subsystem 120 is utilized to capture a photograph, metadata facility 370 may detect the creation of the photograph and generate and provide metadata indicating a time at which the photograph is taken, a user associated with the access subsystem 120 who took the photograph, a content type associated with the photograph (e.g., a photo or image category type, or a file type for a digital photograph), and a location at which the photograph is taken (e.g., a geographic location).

Metadata facility 370 may in similar manner detect other content operations and generate, update, delete, and/or provide metadata associated with the content operations. For example, if the photograph is sent to a destination, such as by transmitting a copy of the photograph over network 225, metadata facility 370 may detect the sending of the photograph and generate and provide metadata indicating a time at which the photograph is sent and the destination to which the photograph is sent (e.g., a user or remote device identifier). Similarly, if another photograph is received by access subsystem 120 from a source, metadata facility 370 may detect the receipt of the other photograph and generate and provide metadata indicating a time at which the other photograph is received and the source that provided the other photograph (e.g., a user or remote device identifier).

As mentioned, content metadata may include location information associated with content. Location detection facility 360 may include any hardware, computing instructions (e.g., software), or combination thereof configured to detect a location of the access subsystem 120. The location may include a network address and/or a geographic location of access subsystem 120. In some embodiments, the location detection facility 360 may be configured to utilize Global Positioning System ("GPS") technologies to determine the geographic location of the access subsystem 120 according to GPS coordinates. Other suitable technologies for determining location may be used in other embodiments, including using principles of trilateration to evaluate radio frequency signals received by the access subsystem 120 (e.g., RF signals in a wireless phone network) and to estimate the geographic location of the access subsystem 120. Such capabilities may be especially helpful when access subsystem 120 is portable (e.g., access subsystem 120 includes or is implemented within a mobile phone).

Metadata facility 370 may provide content metadata to content storage and retrieval subsystem 110 or to content management facility 350, which may be configured to associate the content metadata with the corresponding content and provide the content and/or content metadata to content storage and retrieval subsystem 110. The content metadata may be pushed to or pulled by content storage and retrieval subsystem 110 in accordance with a defined schedule or frequency, or in response to the occurrence of defined events such as a content management operation. As will now be described, content storage and retrieval subsystem 110 may be configured to maintain and utilize the content metadata to identify relationships between content instances, and to utilize the relationships to identify and retrieve related content.

FIG. 4A illustrates an exemplary content storage and retrieval subsystem 110. The components of content storage and retrieval subsystem 110 may include or be implemented as hardware, computing instructions (e.g., software) embodied on a computer-readable medium, or a combination thereof. In certain embodiments, for example, one or more components of content storage and retrieval subsystem 110 may include or be implemented on one or more servers, such as server 210, configured to communicate over network 125. While an exemplary content storage and retrieval subsystem 110 is shown in FIG. 4A, the exemplary components illustrated in FIG. 4A are not intended to be limiting. Indeed, additional or alternative components and/or implementations may be used.

As shown in FIG. 4A, content storage and retrieval subsystem 110 may include a communication module 410, which may be configured to communicate with access subsystem 120, including receiving data representative of content, content metadata, and content data operations from access subsystem 120 and providing data representative of content to access subsystem 120 by way of network 125. The communication module 410 may include and/or support any suitable communication platforms and technologies for communicating with and transporting content and associated data to/from access subsystem 120. Communication module 410 may be configured to support a variety of communication platforms, protocols, and formats such that content storage and retrieval subsystem 110 can receive content from and distribute content to a variety of computing platforms (e.g., a mobile telephone service platform, a web-based platform, a subscriber television platform, etc.) and using a variety of communications technologies. Accordingly, the content storage and retrieval subsystem 110 can support a multi-platform system in which content can be received from and provided to diverse platforms.

Content storage and retrieval subsystem 110 may include a processing module 420 configured to control operations of components of the content storage and retrieval subsystem 110. Processing module 420 may direct execution of operations in accordance with computer-executable instructions stored to a computer-readable medium such as a data store 430. As an example, processing module 420 may be configured to process (e.g., encode, decode, modulate, and/or demodulate) content, content metadata, and communications received from or to be transmitted to access subsystem 120. As another example, processing module 420 may be configured to perform data management operations on data stored in data store 430, including any of the content management operations described above. For example, processing module 420 may operate on content and content metadata, including storing content data 440 and content metadata 450 to data store 430 as shown in FIG. 4A and indexing, searching, accessing, retrieving, modifying, annotating, copying, and/or deleting content data 440 and content metadata 450.

Data store 430 may include one or more data storage media, devices, or configurations and may employ any type, form, and combination of storage media. For example, the data store 430 may include, but is not limited to, a hard drive, network drive, flash drive, magnetic disc, optical disc, random access memory ("RAM"), dynamic RAM ("DRAM"), other non-volatile and/or volatile storage unit, or a combination or sub-combination thereof. Data store 430 may store any suitable type or form of electronic data, including content data 440 and content metadata 450. Content data 440 may include or be stored within one or more content instances, and content metadata 450 may include metadata associated with the content instances. In certain embodiments, content data 440 and content metadata 450 may be stored using one or more suitable data entities and/or structures, including one or more relational or hierarchical data tables, for example. In other embodiments, content metadata 450 may be stored as part of the content instances to which the content metadata 450 is associated.

Content storage and retrieval subsystem 110 may include a tracking module 460, which may be configured to track content management operations and/or content metadata updates and to update content data 440 and/or content metadata 450 accordingly. For example, tracking module 460 may recognize content management commands received from access subsystem 120 and may instruct processing module 420 to operate on content data 440 and/or content metadata 450 based on the commands. For instance, content storage and retrieval subsystem 110 may receive a content operation command instructing that content data 440 be modified. Tracking module 460 may recognize the command, determine a time at which a content modification operation is performed, and update the content metadata 450 to include data representative of the time at which the content modification is performed. Alternatively or additionally, tracking module 460 may be configured to recognize metadata updates received from access subsystem 120 and may instruct processing module 420 to carry the updates into the content metadata 450.

As shown in FIG. 4A, content storage and retrieval subsystem 110 may further include a content relationship module 470, which may include or be implemented as hardware, computing instructions (e.g., software) tangibly embodied on a computer-readable medium, or a combination of hardware and computing instructions configured to perform one or more of the relative content retrieval processes described herein. In certain embodiments, content relationship module 470 may be implemented as a software application embodied on a computer-readable medium such as data store 430 and configured to direct the processing module 420 to execute one or more of the processes described herein.

Content relationship module 470 may be configured to identify certain "relationships" between content instances included in the content data 440 and to utilize the identified relationships to selectively identify and retrieve related content instances. The conditions needed to qualify as a "relationship" between content instances may be defined in advance. For example, content relationship module 470 may include or otherwise have access to a predefined relationship heuristic, which may include one or more conditions defining one or more relationships. When a set of one or more conditions for a relationship is satisfied, content relationship module 470 may identify the existence of the relationship between content instances. Examples of relationships between content, i.e., content relationships, may include, but are not limited to, location based relationships, time based relationships, content type relationships, content source based relationships, content destination based relationships, and user based relationships. These examples are illustrative only. The relationships and conditions for the relationships may be tailored as may suit a particular implementation or application of system 100.

In certain examples, a relationship may be defined to exist between content instances when content metadata 450 associated with content instances includes common metadata values. For example, a location based relationship between content instances may be determined to exist when location metadata values for the content instances are at least substantially. For instance, two photographs created at a common location (e.g., the same geographic location or network address) may be determined to be related by location. Similarly, common metadata values for other components of metadata may be used to determine that other types of relationships exist. Examples of other metadata components may include, but are not limited to, time metadata, user metadata, content type metadata, and source and/or destination metadata. These metadata components may be used to determine whether time based, user based, content type based, content source based, and content destination based relationships exist between content instances. An exemplary time based relationship may identify substantially concurrent performance of content management operations such as creation of content instances at substantially the same time. An exemplary user based relationship may identify that content management operations were initiated by or otherwise associated with the same user or user profile. An exemplary content type based relationship may identify content instances that are of the same type (e.g., same predefined category or file type). An exemplary content source based relationship may identify that content instances have been received from a common source. An exemplary content destination based relationship may identify content instances that have been sent to a common destination.

In certain examples, common metadata values may refer to metadata values that are within a predefined threshold of one another. For example, a location based relationship between content instances may be determined to exist when location metadata values for the content instances are within a predefined maximum geographic distance threshold. For instance, two photographs created at locations that are geographically nearer to one another than the predefined maximum distance may be determined to be related by location. Similarly, predefined thresholds for metadata values for other components of metadata (e.g., a predefined maximum period of time between two time data values) may be used to define and determine that other relationships exist.

Conditions for relationships may be custom defined by user 230. Content storage and retrieval subsystem 110 and/or access subsystem 120 may include a relationship manager module configured to provide one or more tools for custom definition of content relationships. The tools may be provided in any suitable way and may include any mechanism or process that user 230 may utilize to custom define one or more conditions for a content relationship. For example, the relationship manager module may be configured to generate and provide a graphical user interface for display. The graphical user interface may include one or more tools configured to enable the user 230 to customize relationship definition conditions (e.g., common metadata value thresholds). For instance, the user 230 may be able to adjust a maximum distance threshold value to be used for identifying location based content relationships. Similarly, the user 230 may be able to adjust other relationship thresholds. In certain examples, the user 230 may be able to select and deselect any particular metadata component for use or non-use in identifying content relationships. For instance, the user 230 may deactivate certain conditions in the predefined relationship heuristic such that content relationship module 470 will not use the deactivated conditions when identifying relationships. As an example, user 230 may deactivate conditions for time based relationships for a particular content management operation (e.g., sending content) such that time based relationships for the content management operation will not be identified.

Figure 4B:
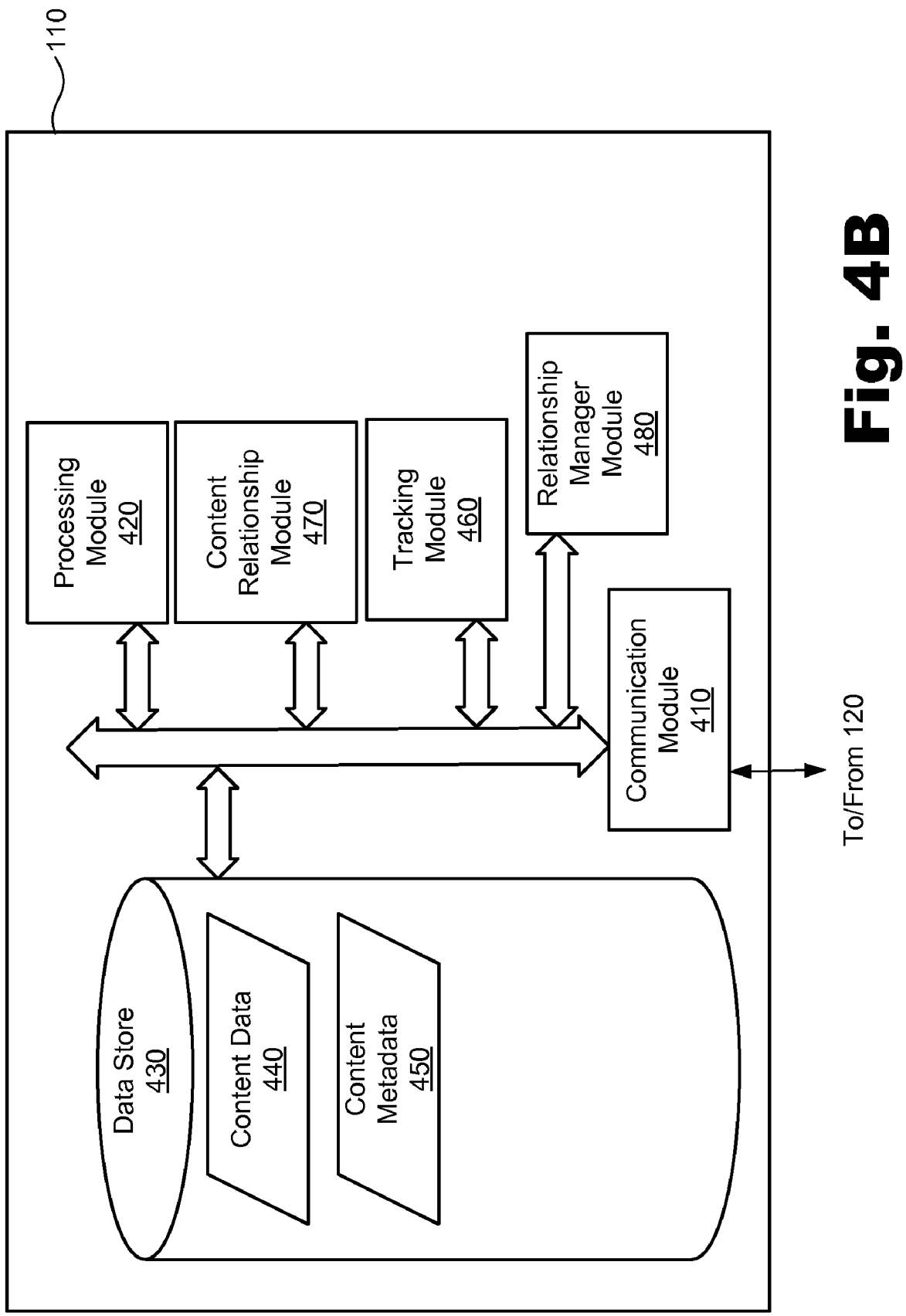
FIG. 4B illustrates an exemplary relationship manager module included in the content storage and retrieval subsystem of FIG. 4A.

FIG. 4B illustrates content storage and retrieval subsystem 110 with an exemplary relationship manager module 480 employed therein. Relationship manager module 480 may be accessible to user 230 by way of access subsystem 120 and may be configured to operate in any of the ways described above.

Content relationship module 470 may be configured to identify relationships between content instances at any suitable time. For example, content relationship module 470 may be configured to identify content relationships in accordance with a predefined schedule or frequency, or at off-peak times. Alternatively or additionally, content relationship module 470 may be configured to identify content relationships in response to the occurrence of a content management operation, such as when a new content instance is received and stored to data store 430. In certain embodiments, content relationship module 470 is configured to dynamically identify one or more content relationships in response to a request for access to and/or retrieval of a content instance.

Figure 5A:
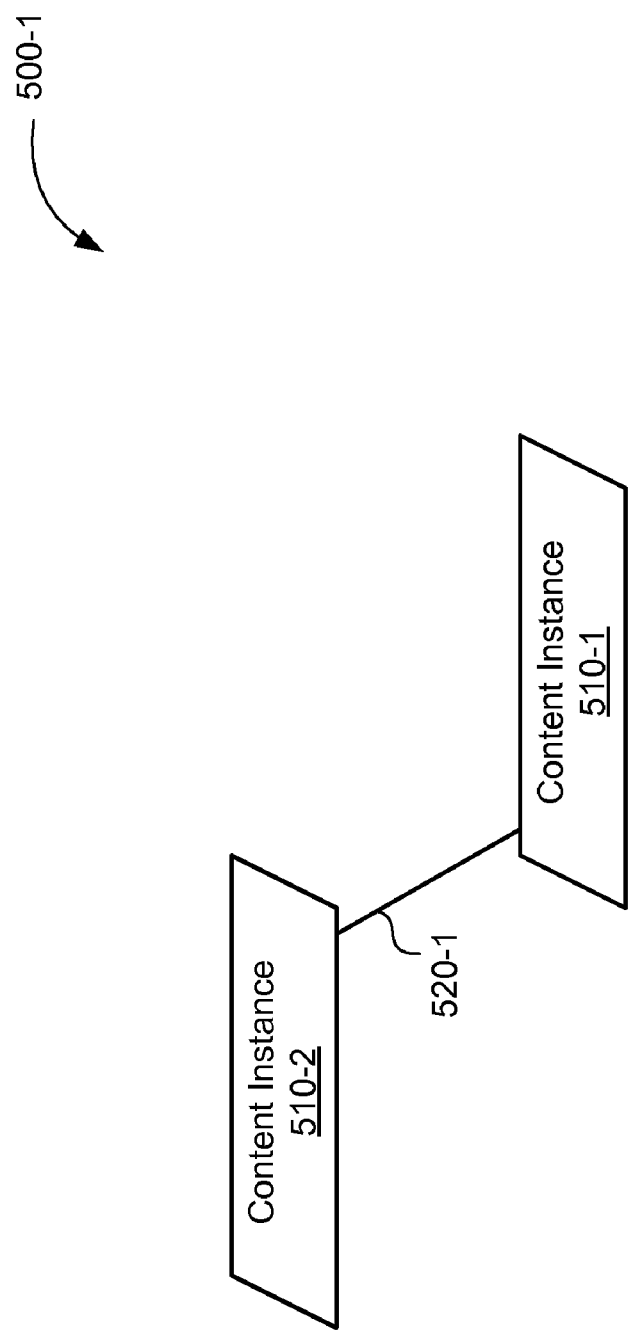
FIGS. 5A-D illustrate several exemplary virtual content relationship maps.

Content instances and the identified relationships between the content instances may form a virtual content relationship map. FIGS. 5A-D illustrate examples of virtual content relationships maps including content instances and relationships between the content instances as may be stored in data store 430. As shown in FIG. 5A, a virtual content relationship map 500-1 may include content instances 510-1 and 510-2 related to one another by relationship 520-1. Content relationship 520-1 may be identified in any of the ways described above, including using a predefined relationship heuristic and content metadata 450 to identify existence of a content relationship between content instances 510-1 and 510-2. As a specific example, user 230 utilizing access subsystem 120 may capture and provide to content storage and retrieval subsystem 110 data representing a photograph and metadata associated with the photograph, e.g., a geographic location at which the photograph is captured. The photograph may be stored in data store 430 as content instance 510-1. At substantially the same geographic location, user 230 may create and provide another content instance 510-2 and associated metadata to content storage and retrieval subsystem 110. For example, content instance 510-2 may be a data object (e.g., a v-card) including contact information for a person the user 230 encountered at the geographic location. Content relationship module 470 may be configured to identify, based on the predefined relationship heuristic and the metadata associated with content instances 510-1 and 510-2, existence of a location-based relationship 520-1 between content instances 510-1 and 510-2.

Figure 5B:
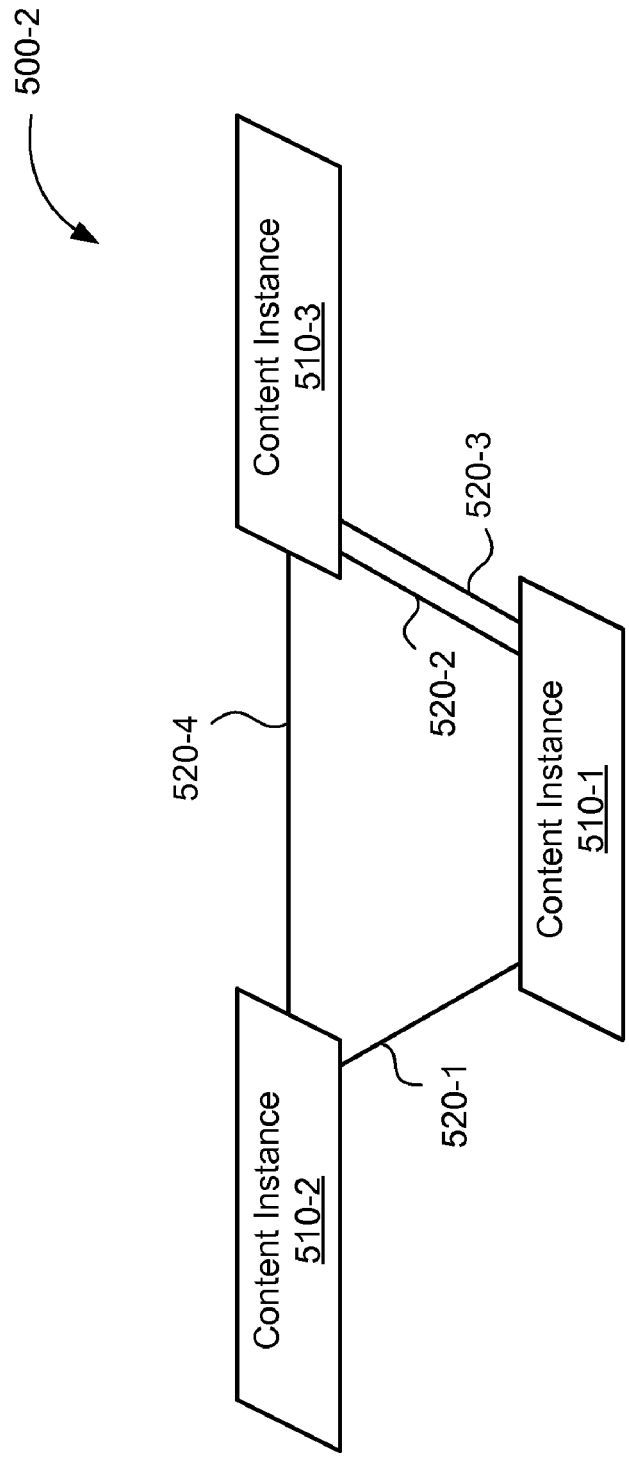

While at substantially the same geographic location, user 230 may utilize access subsystem 120 to capture and provide another photograph to content storage and retrieval subsystem 110, which may be represented as content instance 510-3 in FIG. 5B. Content relationship module 470 may be configured to identify, based on the predefined relationship heuristic and the metadata associated with content instances 510-1, 510-2, and 510-3, existence of relationships between content instances 510-1, 510-2, and 510-3. In addition to location based relationship 520-1, the identified relationships may include location based relationship 520-2 between content instances 510-1 and 510-3 representing a common geographic location, content type relationship 520-3 between content instances 510-1 and 510-3 representing a common content type (e.g., photograph type or file type), and location based relationship 520-4 between content instances 510-2 and 510-3 representing a common geographic location. Content instances 510-1, 510-2, and 510-3 and relationships 520-1, 520-2, 520-3, and 520-4 may form virtual content relationship map 500-2.

Figure 5C:
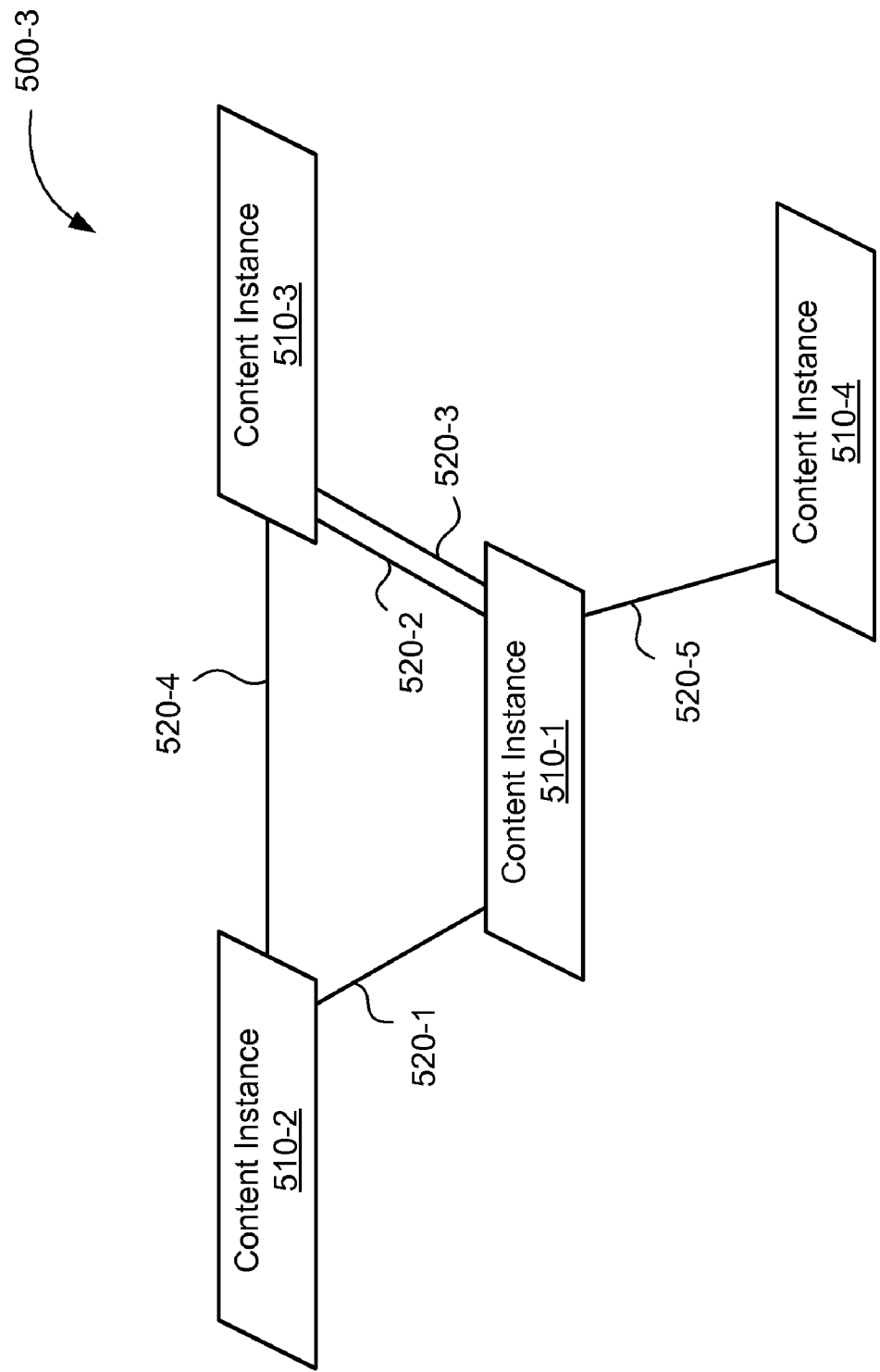

Subsequent to moving away from the geographic location, user 230 may utilize access device 120 to create and transmit a message (e.g., an SMS, MMS, or electronic mail message) to a destination (e.g., a remote device connected to network 225). A copy of content instance 510-1 may be included in the message. Data representative of the message and associated metadata may be provided to content storage and retrieval subsystem 110, which may store the message as content instance 510-4 as shown in FIG. 5C. Content relationship module 470 may be configured to identify, based on the predefined relationship heuristic and the metadata associated with content instances 510-1 and 510-4, existence of a content relationship 520-5 between content instances 510-1 and 510-4. In this particular example, the relationship 520-5 may indicate that content instance 510-1 was an attachment included in content instance 510-4. This may be referred to a message attachment type content relationship. Content instances 510-1, 510-2, 510-3, and 510-4 and relationships 520-1, 520-2, 520-3, 520-4, and 520-5 may form virtual content relationship map 500-3.

Figure 5D:
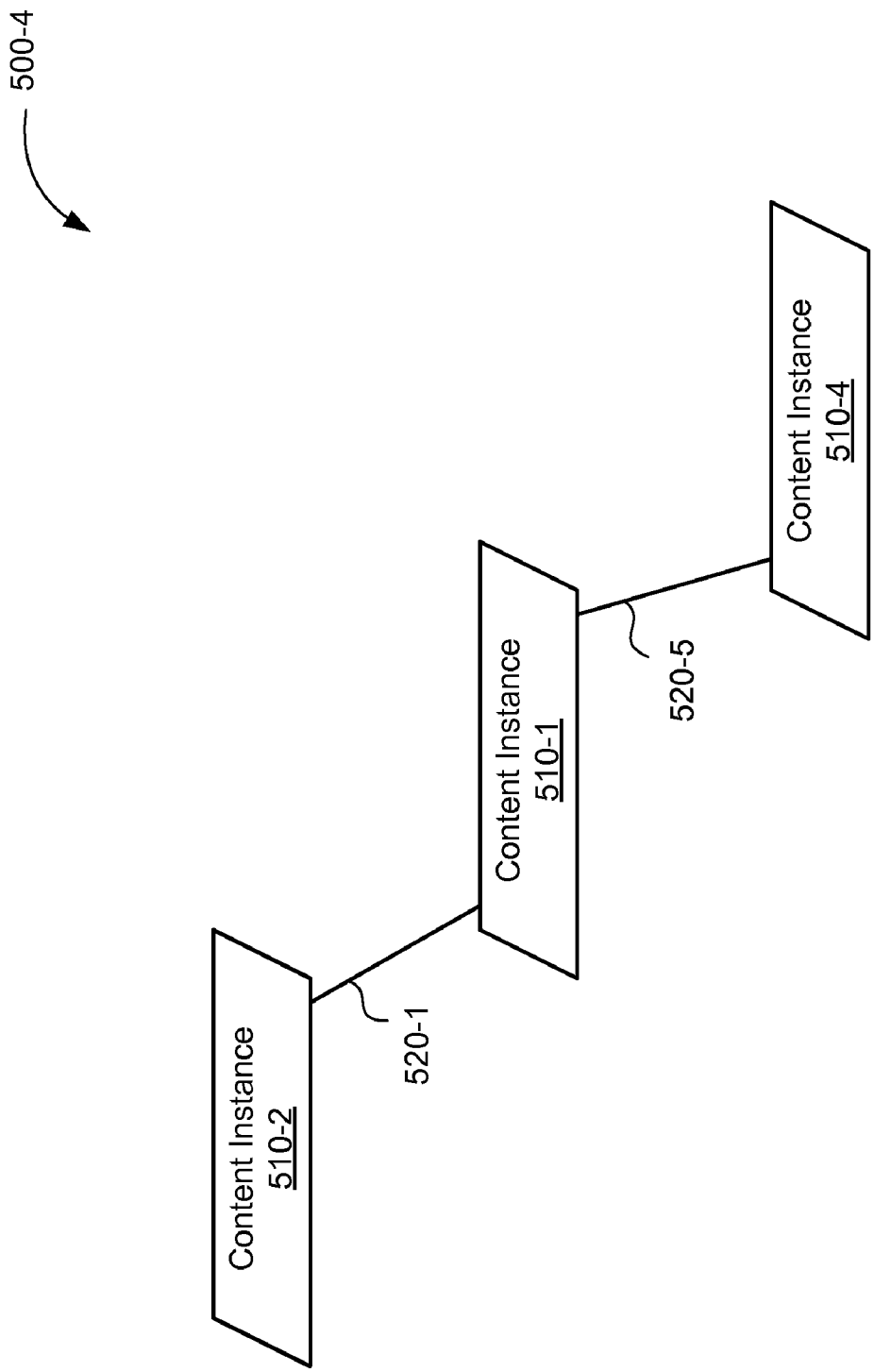

User 230 utilizing access subsystem 120 may instruct content storage and retrieval subsystem 110 to delete content instance 510-3. The content instance 510-3 may be deleted, and tracking module 460 may detect the deletion and update content metadata 450 accordingly. Accordingly, the relationships 520-2, 520-3, and 520-4 may be removed along with content instance 510-3. FIG. 5D illustrates the virtual content relationship map 500-3 shown in FIG. 5C but with content instance 510-3 and relationships 520-2, 520-3, and 520-4 having been removed. The resulting configuration of content instances 510-1, 510-2, and 510-3 and content relationships 520-1 and 520-5 may form virtual content relationship map 500-4 as shown in FIG. 5D.

The virtual content relationship maps 500-1 through 500-4 illustrated in FIGS. 5A-D may be specific to a single user. That is, the content instances 510 may all be provided by, owned by, or otherwise associated with a common user, such as user 230. Accordingly, relationships 520 may be representative of and based on one or more data operations initiated by user 230. Hence, content instances, metadata associated with the content instances, content relationships, and a corresponding virtual content relationship map may be specific to a single user. As described further below, content storage and retrieval subsystem 110 may be configured to maintain and/or form a plurality of user-specific virtual content relationship maps for different users.

One or more components of system 100, including a virtual content relationship map formed by content relationship module 470 may be implemented in or on top of an existing file system such as a standard hierarchical data file system (e.g., a FAT32, NTFS, UFS, JFS, HFS, or HFS+ file system). In certain embodiments, for example, content data 440 may be hierarchically organized and stored in data store 430 using a standard data file system, and content relationship module 470 may use the content data 440 to form a virtual content relationship map on top of the standard data file system.

Content storage and retrieval subsystem 110 and/or access subsystem 120 may be configured to provide one or more tools enabling user 230 to selectively navigate a virtual content relationship map. For example, content storage and retrieval subsystem 110 and/or access subsystem 120 may be configured to provide a graphical user interface with one or more content navigation tools configured to enable user 230 to traverse relationships 520 forming paths between content instances 510 in a virtual content relationship map. Accordingly, user 230 may traverse a path of one or more content relationships 520 to locate a particular content instance 510. For example, user 230 may start at one particular content instance 510-4 in virtual content relationship map 500-3 and traverse content relationship 520-5 to another content instance 510-1 and so on until user 230 locates a particular content instance (e.g., content instance 510-2) in the virtual content relationship map 500-3.

Figure 6A:
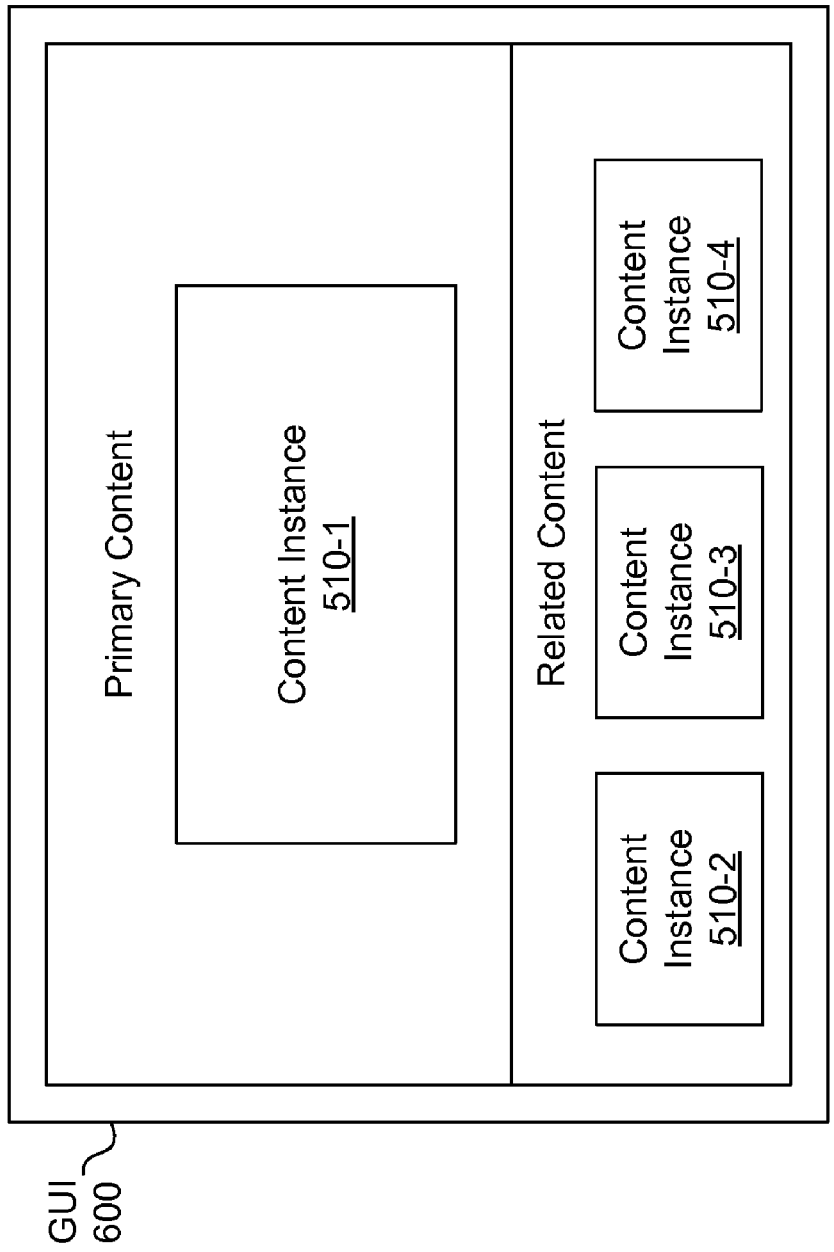

FIGS. 6A-C illustrate an exemplary graphical user interface ("GUI") 600 in which retrieved content may be displayed. For example, user 230 may utilize access subsystem 120 to provide a content retrieval request to content storage and retrieval subsystem 110. The request may be in any suitable form and may include one or more content identifiers or content search parameters. As an example, user 230 may request retrieval of content instance 510-1. Content storage and retrieval subsystem 110 may recognize the request and identify, retrieve, and provide content instance 510-1 to access subsystem 120 based on the request. Content storage and retrieval subsystem 110 may also identify content relationships 520 associated with content instance 510-1 in any of the ways described above and utilize the identified relationships 520 to identify, retrieve, and provide related content instances to access subsystem 120. The access subsystem 120 may be configured to display the retrieved content, including content instance 510-1 and the related content instances in GUI 600. For example, for the virtual content relationship map 500-3 shown in FIG. 5C, content storage and retrieval subsystem 110 may, in response to the request, retrieve and provide content instance 510-1, as well as related content instances 510-2, 510-3, and 510-4 having direct relationships 520-1 through 520-5 with content instance 510-1.

The retrieved content instances 510-1, 510-2, 510-3, and 510-4 may be displayed in GUI 600 as shown in FIG. 6A. As shown, content instance 510-1 may be indicated as "primary content," and content instances 510-2, 510-3, and 510-4 may be indicated as "related content," i.e., content related to the primary content, in GUI 600.

In GUI 600, user 230 may select one of the related content instances 510-2, 510-3, and 510-4 to cause the selected content instance to be moved from the related content section to the primary content section in GUI 600. For example, user 230 may select content instance 510-2, and GUI 600 may be updated as shown in FIG. 6B. As shown, content instance 510-2 is now indicated as "primary content," and content instances 510-1 and 510-3 are now indicated as "related content." When user 230 selects content instance 510-2 in GUI 600 of FIG. 6A, content storage and retrieval subsystem 110 may recognize the selection and retrieve content instance 510-2. Content storage and retrieval subsystem 110 may identify content instances 510-1 and 510-3 as having direct content relationships 520-1 and 520-4 with content instance 510-2. Accordingly, content instance 510-2 may be retrieved and provided to access subsystem 120 as "primary content," and content instances 510-1 and 510-3 may be retrieved and provided to access subsystem 120 as "related content."

By selecting content instance 510-2 in FIG. 6A, user 230 has traversed relationship 520-1 to cause processing to move from content instance 510-1 to content instance 510-2. In other words, user 230 has selected and used a relationship-defined path from one content instance 510-1 to another content instance 510-2 to locate content instance 510-2. In similar manner, user 230 may to select other related content to traverse another path in virtual content relationship map 500-3.

In certain embodiments, GUI 600 may provide information descriptive of how related content is related to primary content. For example, GUI 600 may be configured to indicate relationship types for related content instances 510. FIG. 6C illustrates GUI 600 including information indicating that related content instance 510-1 is related to content instance 510-2 by a location based relationship and that related content instance 510-3 is also related to content instance 510-2 by a location based relationship. The relationship type indicators shown in FIG. 6C are illustrative only. Other types of relationships may be indicated, and any suitable indicator mechanism may be employed.

The relationship type indicators may assist user 230 in selectively traversing the virtual content relationship map 500-3. For example, user 230 may recall meeting the person associated with the contact information included in content instance 510-2 but may not remember the name of the person. However, user 230 may recall the geographic location as which user 230 met the person and that the photograph associated with content instance 510-1 was captured at the same location. User 230 may retrieve content instance 510-1 and use relationship type indicators in GUI 600 to look for related content instances 510 having location based relationships with content instance 510-1. User 230 may select and retrieve such a content instance 510-2. In this or similar manner, user 230 may leverage content relationships between content instances 510 to locate a particular content instance 510-2.

While FIGS. 6A-C show related content displayed in GUI 600, this is illustrative only. Related content may be indicated in any suitable manner. For example, the related content section may include selectable links to related content instances 510.

In the examples described above, user 230 may utilize access subsystem 120 to provide and retrieve content, as well as to manage content and define conditions for content relationships such that content storage and retrieval subsystem 110 can form and/or maintain a virtual content relationship map of content associated with user 230. In certain embodiments, access subsystem 120 may be configured such that user 230 may utilize multiple access devices to provide, manage, and retrieve content and defined content relationships.

For example, FIG. 7 illustrates an exemplary implementation 700 of system 100. As shown in FIG. 7, the implementation 700 may include content storage and retrieval subsystem 110 and an access device 220 configured to communicate with one another by way of a mobile phone network 710. Access device 220 may communicate with the content storage and retrieval subsystem 110 over mobile phone network 710 in any of the ways described above. Accordingly, user 230 may utilize access device 220 to post, manage, and retrieve content, including related content as described above. In addition, content storage and retrieval subsystem 110 may be configured to communicate with an additional access device 720 over another connection such as a connection over the Internet 730. In addition, content storage and retrieval subsystem 110 may be configured to communicate with another additional access device 740 (e.g., a set-top box) over another connection such as a connection over a subscriber television network 750. Hence, user 230 may be able to utilize access device 220, additional access device 720, and/or additional access device 740 to post, manage, and retrieve content. Mobile phone network 710, the Internet 730, and subscriber television network 750 may be part of network 225 shown in FIG. 2.

As mentioned above, content storage and retrieval subsystem 110 may be configured to generate and/or maintain a plurality of user-specific virtual content relationship maps.

FIG. 8 illustrates another implementation 800 of system 100 in which multiple users 230-1 through 230-N may utilize multiple access devices 220-1 through 220-N, respectively, to provide, manage, and retrieve content. Access devices 220-1 through 220-N and content storage and retrieval subsystem 110 may be configured to communicate over network 225.

As shown in FIG. 8, content storage and retrieval subsystem 110 may form and/or maintain user-specific virtual content relationship maps 810-1 through 810-N, which may be associated with users 230-1 through 230-N, respectively. Accordingly, content storage and retrieval subsystem 110 may generate and maintain multiple user-specific virtual content relationship maps 810-1 through 810-N, which may be defined in accordance with user-specific content and definitions of content relationships.

Figure 9:
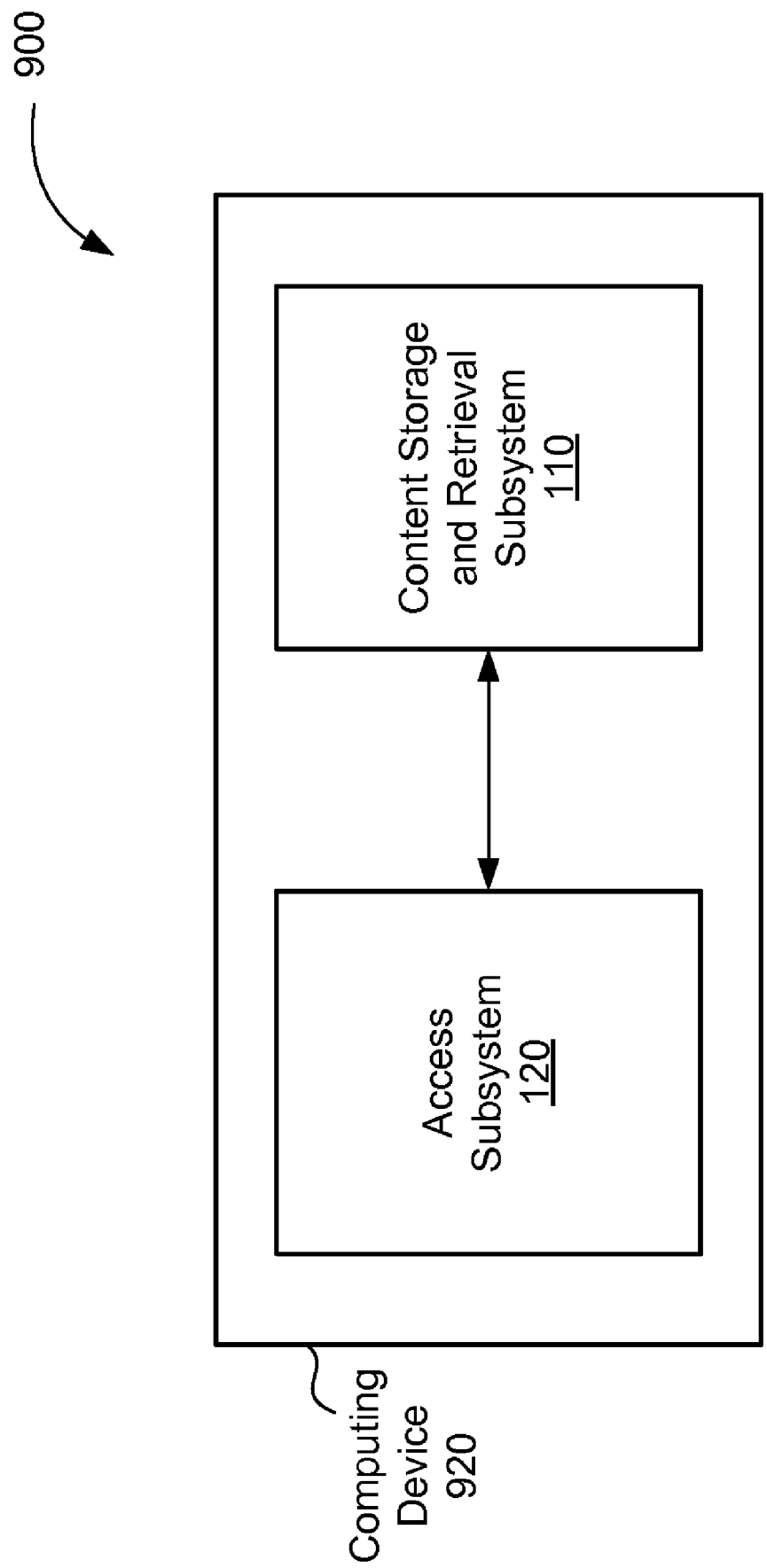
FIG. 9 illustrates an exemplary local implementation of the system of FIG. 1.

FIG. 9 illustrates an exemplary local implementation 900 of system 100. As shown in FIG. 9, access subsystem 120 and content storage and retrieval subsystem 110 of system 100 may be implemented in a single computing device 920. Accordingly, the principles and processes described herein may be employed for local content storage, management, and retrieval, including retrieval of related content.

Figure 10:
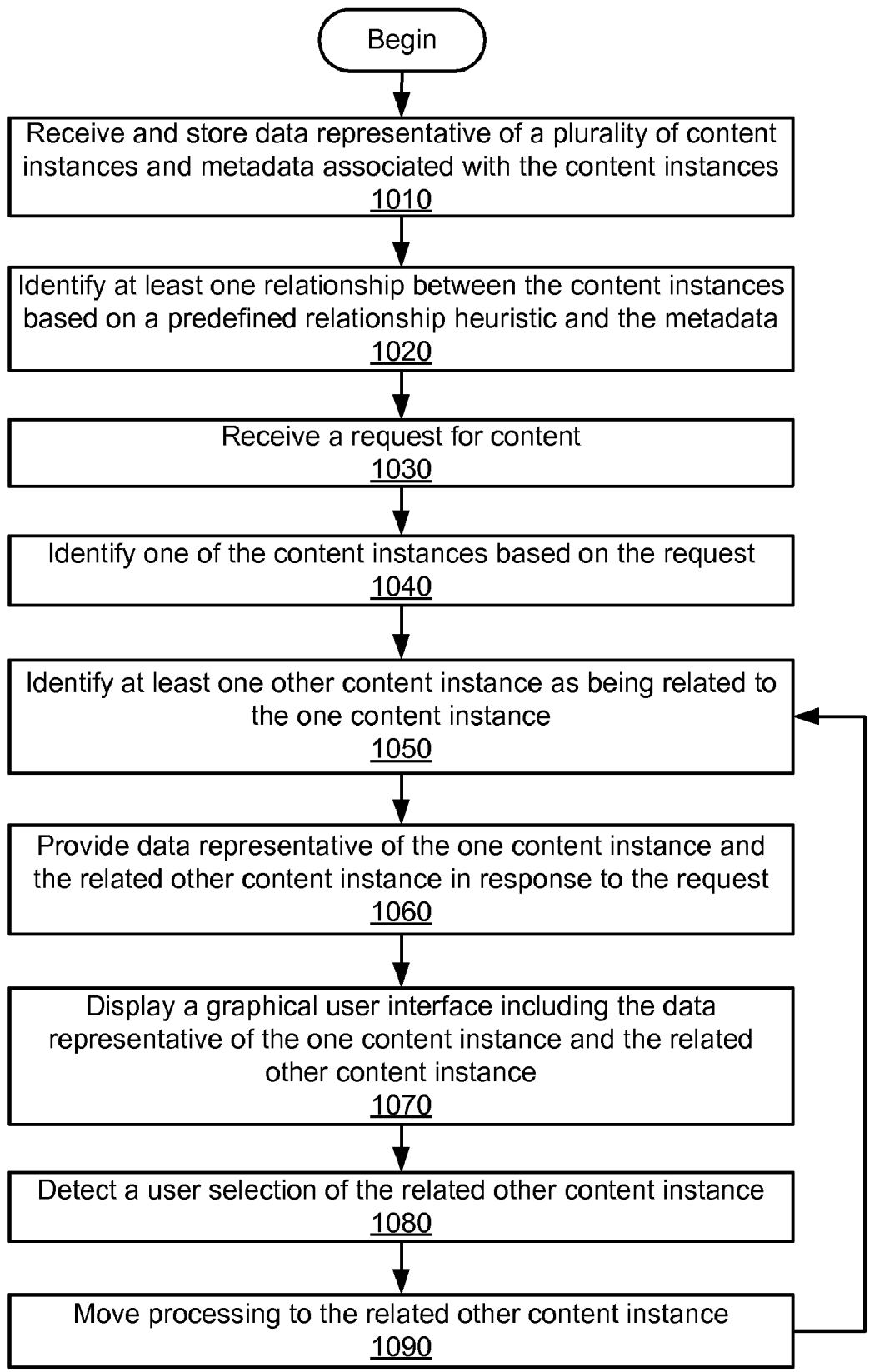
FIG. 10 illustrates an exemplary relative content storage and retrieval method.

FIG. 10 illustrates an exemplary method of relative content storage and retrieval. While FIG. 10 illustrates exemplary steps according to one embodiment, other embodiments may omit, add to, reorder, and/or modify any of the steps shown in FIG. 10.

In step 1010, data representative of a plurality of content instances and metadata associated with the content instances is received and stored. Step 1010 may be performed in any of the ways described above, including content storage and retrieval subsystem 110 receiving the content instances and metadata from access subsystem 120 and storing the content instances and metadata to data store 430 as content data 440 and content metadata 450. In certain embodiments, the content instances and metadata may be included in one or more content postings provided by a user utilizing access subsystem 120 to communicate with content storage and retrieval subsystem 110.

In step 1020, at least one relationship between the content instances is identified based on a predefined relationship heuristic and the metadata. Step 1020 may be performed in any of the ways described above and may utilize any suitable definition of content relationships as specified in the predefined relationship heuristic. The identified relationship(s) and content instances may form a virtual content relationship map such as any of those illustrated in FIGS. 5A-D.

In step 1030, a request for content is received. Step 1030 may be performed in any of the ways described above, including content storage and retrieval subsystem 110 receiving the request for content from access subsystem 120.

In step 1040, one of the content instances is identified based on the request. Step 1040 may be performed in any of the ways described above, including content storage and retrieval subsystem 110 using information included in the request to search for and locate the content instance. Metadata associated with the content instance may include information that is determined to match information included in the request.

In step 1050, at least one other content instance is identified as being related to the one content instance identified in step 1040. Step 1050 may be performed in any of the ways described above, including content storage and retrieval subsystem 110 making the identification based on the predefined relationship heuristic and the metadata, or on a relationship identified in step 1020.

In step 1060, data representative of the one content instance and the related other content instance is provided in response to the request. Step 1060 may be performed in any of the ways described above, including content storage and retrieval subsystem 110 providing the data to access subsystem 120.

In step 1070, a graphical user interface including the data representative of the one content instance and the related other content instance is displayed. Step 1070 may be performed in any of the ways described above, including access subsystem 120 displaying the graphical user interface for consideration by a user of the access subsystem 120.

In step 1080, a user selection of the related other content instance is detected. Step 1080 may be performed in any of the ways described above, including access subsystem 120 detecting a user selection of the related other content instance, or a visual object corresponding with the related other content object, included in the graphical user interface. Step 1080 may include access subsystem 120 notifying content storage and retrieval subsystem 110 of the detected user selection.

In step 1090, processing is moved to the related other content instance. Step 1090 may be performed in response to the detected user selection in step 1080. Step 1090 may be performed in any of the ways described above, including traversing a content relationship connecting the one content instance to the related other content instance and making the related other content instance the central focus of subsequent processing.

As shown in FIG. 10, from step 1090, processing may return to step 1050, and any of steps 1050-1090 may be repeated with the processing now being focused on the related other content instance. This loop may be repeated each time another related content instance is selected. Accordingly, a user can traverse one or more content relationships to create and navigate a path between one or more content instances. In this manner, the user may leverage content relationships to conveniently search for and locate a desired content instance.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
  maintaining, by at least one computing device, a plurality of content instances and metadata associated with said content instances;
  receiving, by said at least one computing device, a request for content; identifying, by said at least one computing device, one of said content instances based on said request;
  identifying, by said at least one computing device, at least one other of said content instances as being related to said one of said content instances based on a predefined relationship heuristic and said metadata associated with said content instances;
  displaying, by said at least one computing device, a graphical user interface including data representative of said one of said content instances and said at least one other of said content instances, said displaying further comprising indicating said one of said content instances as primary content in said graphical user interface, and indicating said at least one other of said content instances as related content in said graphical user interface;

detecting, by said at least one computing device, a user selection of one of said at least one other of said content instances in said graphical user interface;

updating, by said at least one computing device in response to said user selection, said graphical user interface to indicate said one of said at least one other of said content instances as said primary content and said one of said content instances as said related content; and identifying, based on said predefined relationship heuristic, a common metadata value associated with said at least one other of said content instances in said metadata.

2. The method of claim 1, wherein said identifying said at least one other of said content instances as being related to said one of said content instances comprises:

identifying a metadata value associated with said one of said content instances in said metadata, wherein said common metadata value comprises at least one of a common location data value, a common time data value, a common user identifier, and a common content type.

3. The method of claim 1, further comprising moving, by said at least one computing device, processing from said one of said content instances to said one of said at least one other of said content instances in response to said user selection.

4. The method of claim 1, wherein said displaying includes indicating, in said graphical user interface, a type of relationship between said one of said content instances and said at least one other of said content instances.

5. The method of claim 1, wherein said predefined relationship heuristic comprises at least one condition for determining a content relationship to exist.

6. The method of claim 5, further comprising providing, by said at least one computing device, at least one tool enabling a user to custom define said at least one condition.

7. The method of claim 1, further comprising:

tracking, by said at least one computing device, at least one data operation associated with said plurality of content instances; and updating, by said at least one computing device, said metadata based on said at least one data operation.

8. The method of claim 1, further comprising receiving, by said at least one computing device, data representative of said plurality of content instances and said metadata, wherein said content instances, said metadata, and said predefined relationship heuristic are specific to a single user.

9. The method of claim 1, tangibly embodied as computer-executable instructions on at least one non-transitory computer-readable medium.

10. The method of claim 1, wherein said metadata associated with said content instances excludes user-defined metadata.

11. The method of claim 1, wherein said graphical user interface comprises a first display window within which said primary content is displayed and a second display window within which said related content is displayed.

12. The method of claim 1, wherein said user selection of said one of said at least one other of said content instances represents a traversal of a relationship path between said one of said content instances and said one of said at least one other of said content instances in a virtual content relationship map.

13. A method comprising:

maintaining, by at least one computing device, a plurality of content instances and metadata associated with said plurality of content instances;

receiving, by said at least one computing device, a request for a first content instance within said plurality of content instances;

identifying, by said at least one computing device, a second content instance within said plurality of content instances as being related to said first content instance based on a predefined relationship heuristic and said metadata associated with said plurality of content instances;

identifying, by said at least one computing device, a third content instance within said plurality of content instances as being related to said second content instance based on said predefined relationship heuristic and said metadata associated with said plurality of content instances;

providing, by said at least one computing device, data representative of said first content instance and said second content instance in response to said request; detecting, by said at least one computing device, a user selection of said second content instance;

providing, by said at least one computing device, data representative of said first content instance, said second content instance, and said third content instance in response to said user selection; and identifying, based on said predefined relationship heuristic, a common metadata value associated with said second content instance.

14. The method of claim 13, wherein said identifying said second content instance as being related to said first content instance comprises: identifying a metadata value associated with said first content instance.

15. The method of claim 13, wherein said identifying said third content instance as being related to said second content instance comprises:

identifying a metadata value associated with said second content instance; and identifying, based on said predefined relationship heuristic, a common metadata value associated with said third content instance.

16. The method of claim 13, wherein said providing said data representative of said first content instance and said second content instance comprises displaying said data representative of said first content instance and said second content instance within a graphical user interface.

17. The method of claim 16, wherein said displaying said data representative of said first content instance and said second content instance within said graphical user interface comprises displaying, within said graphical user interface, a first image representative of said first content instance and a second image representative of said second content instance, and wherein said detecting said user selection of said second content instance comprises detecting a user selection of said second image.

18. The method of claim 16, wherein said displaying said data representative of said first content instance and said second content instance within said graphical user interface further comprises:

indicating, within said graphical user interface, that said first content instance is primary content; and indicating, within said graphical user interface, that said second content instance is related content.

19. The method of claim 18, wherein said providing said data representative of said first content instance, said second content instance, and said third content instance in response to said user selection comprises updating said graphical user interface to display said data representative of said first content instance, said second content instance, and said third content instance in response to said user selection.

20. The method of claim 19, wherein said updating said graphical user interface to display said data representative of said first content instance, said second content instance, and said third content instance in response to said user selection further comprises updating said graphical user interface to:
   indicate that said second content instance is said primary content; and
   indicate that said first content instance and said third content instance are said related content.

21. The method of claim 18, wherein said metadata associated with said plurality of content instances excludes tags.

22. A system comprising:
   a content storage and retrieval subsystem configured to
      maintain a plurality of content instances and metadata associated with said plurality of content instances;
      receive a request for content;
      identify one content instance within said plurality of content instances based on said request;
      identify at least one other content instance within said plurality of content instances as being related to said one content instance based on a predefined relationship heuristic and said metadata associated with said plurality of content instances;
      provide data representative of said one content instance and said at least one other content instance for display within a graphical user interface, said graphical user interface indicating said one content instance as primary content and said at least one other content instance as related content;
      detect a user selection of said at least one other content instance; and
      update said graphical user interface to indicate said at least one other content instance as said primary content and said one content instance as said related content and
      identify, based on said predefined relationship heuristic, a common metadata value associated with said at least one other of said content instances in said metadata.

* * * * *